W. BENCH.
Carriage-Seat.
No. 53,371. Patented Mar. 20, 1866.
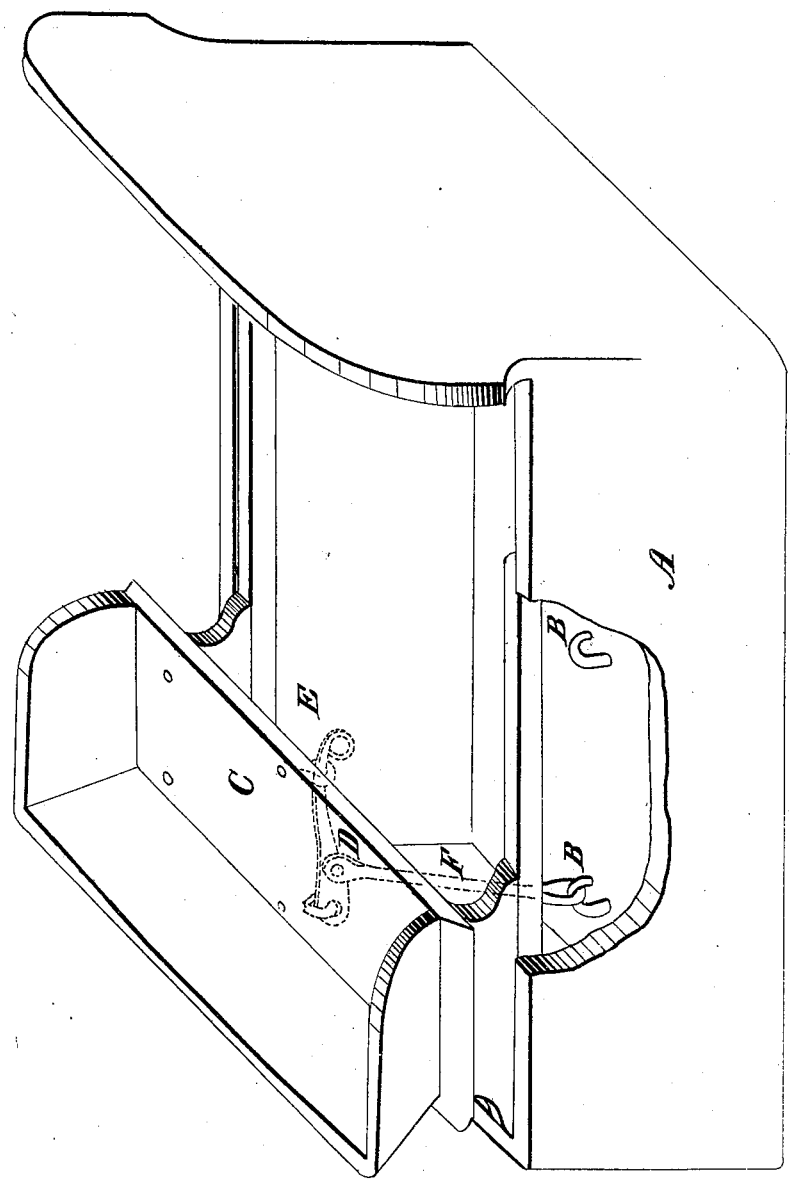
Witnesses.
C. F. Clausen.
L. A. Murphy
Inventor.
Wm Bench
by
D. P. Holloway & Co
his attys.

UNITED STATES PATENT OFFICE.

WILLIAM BENCH, OF AUBURN, NEW YORK, ASSIGNOR TO HIMSELF AND GEO. BENCH, OF SAME PLACE.

IMPROVEMENT IN ATTACHING SEATS TO THE BEDS OF VEHICLES.

Specification forming part of Letters Patent No. 53,371, dated March 20, 1866.

*To all whom it may concern:*

Be it known that I, WILLIAM BENCH, of Auburn, in the county of Cayuga and State of New York, have invented a new and and useful Mode of Fastening the Seats in Wagons and other Vehicles; and I do hereby declare that the following is a full, clear, and exact description of the same, reference being had to the annexed drawing, made part of this specification, in which the body of an ordinary spring-wagon is represented.

A is the body of a wagon, represented as broken away to show the mode of attaching the seat.

In the bottom of the wagon-bed hooks B B are inserted, or their equivalents are used. In either of these hooks, as may be desired, the eye of the rod F is placed. The seat C being in position, the lever D, which is a lever of the second order, secured by a hinge-joint under the seat, is raised, and its movable end is fastened in the hook E, by which means the seat is held rigidly in place.

I do not confine my claim to the precise arrangement of parts here described, for the several parts may be varied without altering the essential principles of my invention. Thus a rod running along the floor might be substituted for the hooks and any other convenient modes of operating and attaching the lever be desired.

What I claim as my invention, and seek to secure by Letters Patent, is—

A device for adjustably securing the seats to the beds of wagons and other vehicles at any desired point by the stress of a lever hinged, secured, and connected substantially in the manner set forth.

In testimony whereof I have signed my name to this specification in the presence of two subscribing witnesses.

WILLIAM BENCH.

Witnesses:
Z. LEWIS WEBB,
D. BALDWIN.